(12) United States Patent
Antanies

(10) Patent No.: US 9,665,395 B1
(45) Date of Patent: May 30, 2017

(54) COMPUTERIZED METHOD OF IDENTIFYING PROCESS DATA EXCEPTIONS

(71) Applicant: John Antanies, Phoenix, AZ (US)

(72) Inventor: John Antanies, Phoenix, AZ (US)

( * ) Notice: Subject to any disclaimer, the term of this patent is extended or adjusted under 35 U.S.C. 154(b) by 0 days.

(21) Appl. No.: 14/962,915

(22) Filed: Dec. 8, 2015

Related U.S. Application Data

(63) Continuation of application No. 13/553,807, filed on Jul. 19, 2012, now Pat. No. 9,207,970, which is a continuation-in-part of application No. 12/489,303, filed on Jun. 22, 2009, now abandoned, which is a continuation of application No. 11/691,871, filed on Mar. 27, 2007, now Pat. No. 7,555,405, which is a continuation-in-part of application No. 10/954,082, filed on Sep. 30, 2004, now Pat. No. 7,283,928.

(60) Provisional application No. 61/509,233, filed on Jul. 19, 2011.

(51) Int. Cl.
  *G06F 17/18* (2006.01)
  *G06F 9/48* (2006.01)
  *G05B 23/02* (2006.01)
  *G06F 9/54* (2006.01)

(52) U.S. Cl.
  CPC ............ *G06F 9/4825* (2013.01); *G06F 9/542* (2013.01)

(58) Field of Classification Search
  CPC ............ G05B 23/0232; G05B 23/0267; G05B 23/0216; G06F 9/4812
  USPC ...... 702/59, 60, 65, 68, 80, 81, 83, 95, 120, 702/123, 146, 179, 183, 185; 700/52, 97
  See application file for complete search history.

(56) References Cited

U.S. PATENT DOCUMENTS 9,207,970 B1 * 12/2015 Antanies ............ G05B 23/0267
2005/0283337 A1 * 12/2005 Sayal ..................... G06Q 10/00
                                                                    702/179

* cited by examiner

*Primary Examiner* — John H Le
(74) *Attorney, Agent, or Firm* — Booth Udall Fuller, PLC

(57) ABSTRACT

A method for identifying data exceptions in a process includes: receiving an array of data from a data historian comprising filtered data from the process including one or more dependent variables and one or more independent variables; defining, by a microprocessor, a plurality of time slices or bins within the array of filtered data with a predetermined time period; identifying, by a microprocessor, all variables outside of limits that are continuously updated, based only on data when the process is running; and identifying, by a microprocessor, a date of an exception.

14 Claims, 20 Drawing Sheets

| | Normalized Breaks 1 Days | PM6 Reel Speed | CTN COUCH ROLL HI VAC | MAIN STEAM DRYER FLOW | HD BX SLICE FLOW | 1st Top Felt Uhle Bx Sep Tk Ovrflw | 2nd Top Felt Uhle Bx OverFlw | 2nd Bot Felt Uhle Bx Overflow |
|---|---|---|---|---|---|---|---|---|
| Deformer Trial (4) | 4.06 | 3,804.58 | 18.45 | 89,843.30 | 18,199.85 | 89.05 | 54.68 | 0.00 |
| Average All | 2.58 | 3,534.49 | 20.03 | 91,763.08 | 18,080.93 | 184.75 | 39.76 | 13.99 |
| Ranking (percent of population lower than trial) | 89% | 97% | 2% | 32% | 50% | 26% | 65% | 0% |
| Probability the difference is meaningful | 87% | 85% | 98% | 64% | 56% | 77% | 66% | 87% |

FIG. 11

Enclosed Numbers are discrete event counts; in this case, good = 1

Numbers are the values for the production trigger using the supplied filter criteria

| 7/28/2006 7:00 | 7/28/2006 3:00 | 7/27/2006 23:00 | 7/27/2006 19:00 | 7/27/2006 19:00 | 7/27/2006 15:00 | 7/27/2006 7:00 | 7/27/2006 3:00 |
|---|---|---|---|---|---|---|---|
| 3 | 1 | 2 | 1 | 1 | 1 | 1 | 1 |
| 1 | 1 | 1 | 0 | 1 | 1 | 1 | 1 |
| 1 | 0 | 0 | 1 | 1 | 1 | 1 | 1 |
| 0 | 1 | 1 | 1 | 1 | 1 | 1 | 1 |
| 1 | 1 | 0 | 1 | 1 | 0 | 0 | 1 |
| 1 | 1 | 0 | 1 | 1 | 1 | 1 | 1 |
| 0 | 1 | 1 | 1 | 1 | 1 | 1 | 1 |
| 1 | 1 | 1 | 0 | 1 | 0 | 1 | 1 |
| 0 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG. 12

| TagName | Description | High Limit | Low Limit | Last Value | Consecutive Slices | % Deviation | Most Recent Slice | Date Of Deviaton |
|---|---|---|---|---|---|---|---|---|
| pr.30-JI-4010:av | 22Total Draw % of Wire Speed | 4238.24 | 380.95 | 6.513416624 | 37 | 5748.68% | 12/20/2011 7:00 | 11/13/2011 7:00 |
| ABC-40-RAT-877.av | UHLE 2-BOTT VAC SEP CTRL | 95.58 | 64.93 | 45.59831865 | 1 | 42.41% | 12/20/2011 7:00 | 12/19/2011 7:00 |
| ABC-GML-3812A.av | UHLE 2ND BOTT VAC SEP LV | 16.18 | 6.38 | 4.802718477 | 6 | 32.74% | 12/20/2011 7:00 | 12/14/2011 7:00 |
| ABC-PML-3321B:av | 22Total Draw -Wire to Reel | 2738.79 | -844.05 | 3926.615557 | 2 | 30.25% | 12/20/2011 7:00 | 12/18/2011 7:00 |
| ABC-40-FC-1030:me | 22MainDry 7Top to BaseStk D | .52 | .04 | 0.692115159 | 2 | 25.51% | 12/20/2011 7:00 | 12/18/2011 7:00 |
| ABC-30-CC-361B:av | AIR MAKEUP 10-13 SUPPLY | 19.34 | 10.31 | 23.87269269 | 2 | 18.99% | 12/20/2011 7:00 | 12/18/2011 7:00 |
| ABC-40-PC-612:spa | AIR MAKEUP 1-5 SUPPLY VL | 15.95 | 8.26 | 6.96714579 | 1 | 18.50% | 12/20/2011 7:00 | 12/19/2011 7:00 |
| ABC-40-LC-507:av | DRYER 1 PRESS CTRL OUTF | 77.59 | 20.60 | 94.580201 | 3 | 17.97% | 12/20/2011 7:00 | 12/17/2011 7:00 |
| ABC-70-FC-987:con | 22PrimeStk to Drum Draw | 81.81 | -15.88 | 99.61684286 | 12 | 17.88% | 12/20/2011 7:00 | 12/8/2011 7:00 |
| ABC-40-PC-604:con | 22PrimeStk to ReelSprdr Draw | 26.69 | -3.80 | 32 | 23 | 16.58% | 12/20/2011 7:00 | 11/27/2011 7:00 |
| DEF-92-60 | 2ND MAIN DRYER F-OUT SHE | 16.69 | 9.28 | 19.93879522 | 1 | 16.27% | 12/20/2011 7:00 | 12/19/2011 7:00 |
| ABC-30-PI-511:av | AIR MAKEUP VENT 1-5 TEMF | 26.40 | 14.72 | 12.8552318 | 10 | 14.51% | 12/20/2011 7:00 | 12/10/2011 7:00 |
| ABC-GML-3850H | AIR MAKEUP VENT 10-13 TEI | 54.45 | 6.02 | 63.41121743 | 1 | 14.13% | 12/20/2011 7:00 | 12/19/2011 7:00 |
| ABC-40-PC-605:con | AIR MAKEUP 10-13 SUPPLY | 24.45 | -2.43 | 28 | 23 | 12.69% | 12/20/2011 7:00 | 11/27/2011 7:00 |
| ABC-70-LC-202:spa | AIR MAKEUP 1-5 SUPPLY VL | 74.64 | 51.25 | 85 | 2 | 12.18% | 12/20/2011 7:00 | 12/18/2011 7:00 |
| ABC-GML-3850J | 22PrimeStk to ReelLeadIn Dra | 60.11 | 11.03 | 68.32019033 | 1 | 12.01% | 12/20/2011 7:00 | 12/19/2011 7:00 |
| ABC-70-LC-159:me | DRYR 39.41 PRESSURE CTR | 65.43 | -4.82 | 74.02869534 | 1 | 11.62% | 12/20/2011 7:00 | 12/19/2011 7:00 |
| ABC-30-FC-171:me | DRYER 39.41 PRESSURE | 674.65 | 450.29 | 405.0816273 | 1 | 11.16% | 12/20/2011 7:00 | 12/19/2011 7:00 |
| ABC-SPL-3810W:av | DRYR 40 PRESSURE CTRL S | 838.68 | 677.78 | 939.8338261 | 3 | 10.76% | 12/20/2011 7:00 | 12/17/2011 7:00 |
| ABC-70-FC-208:spa | DRYR 39.41 PRESSURE CTR | 244.95 | 188.28 | 170 | 11 | 10.75% | 12/20/2011 7:00 | 12/9/2011 7:00 |
| ABC-70-FC-208:me | ECONIMIZER PMP-3 SPEED | 244.33 | 187.64 | 169.7696175 | 11 | 10.53% | 12/20/2011 7:00 | 12/9/2011 7:00 |
| ABC-30-FC-171:con | ECONIMIZER PMP-4 SPEED | 36.33 | 21.04 | 19.04317055 | 1 | 10.49% | 12/20/2011 7:00 | 12/19/2011 7:00 |
| ABC-40-LI-217:av | ECONIMIZER PMP-1 SPEED | 56.60 | 29.48 | 63.11110488 | 1 | 10.31% | 12/20/2011 7:00 | 12/19/2011 7:00 |
| DEF-91-27 | ECONIMIZER PMP-2 SPEED | 579.22 | -328.10 | 636.4527542 | 5 | 8.99% | 12/20/2011 7:00 | 12/15/2011 7:00 |
| DEF-as-059 | SIC GLYCOL HEAT RECIRC 1 | 59.59 | -35.46 | 65.43109314 | 5 | 8.93% | 12/20/2011 7:00 | 12/15/2011 7:00 |
| DEF-as-059:a | LEAD IN BOX VACUUM CON | 59.60 | -35.46 | 65.43109314 | 5 | 8.92% | 12/20/2011 7:00 | 12/15/2011 7:00 |
| ABC-30-PI-513:av | SIC GLYCOL HEAT RECIRC 1 | 8.89 | 4.82 | 4.440922112 | 1 | 8.46% | 12/20/2011 7:00 | 12/19/2011 7:00 |

FIG. 14

| TagName | Description | High Lim | Low Lim | Last Value | Consecutive Slices | % Deviation | Most Recent Slice | Date Of Deviation |
|---|---|---|---|---|---|---|---|---|
| ABC-40-PC-604.con | 22PrimeStk to ReelSprdr Draw | 26.69 | -3.80 | 32 | 23 | 16.58% | 12/20/2011 7:00 | 11/27/2011 7:00 |
| ABC-40-PC-605.con | AIR MAKEUP 10-13 SUPPLY | 24.45 | -2.43 | 28 | 23 | 12.69% | 12/20/2011 7:00 | 11/27/2011 7:00 |

FIG. 15

COMPUTERIZED METHOD OF IDENTIFYING PROCESS DATA EXCEPTIONS

CROSS REFERENCE TO RELATED APPLICATIONS

This application is a continuation of the earlier U.S. patent application Ser. No. 13/553,807, filed Jul. 19, 2012, now pending, which claims the benefit of the earlier U.S. Provisional Patent Application, Ser. No. 61/509,233, filed Jul. 19, 2011. U.S. patent application Ser. No. 13/553,807 is also a continuation-in-part application of the earlier U.S. Utility patent application Ser. No. 12/489,303, filed Jun. 22, 2009, now abandoned, which is a continuation application of the earlier U.S. Utility patent application Ser. No. 11/691,871, filed Mar. 27, 2007, now U.S. Pat. No. 7,555,405, which is a continuation-in-part application of the earlier U.S. Utility patent application Ser. No. 10/954,082, filed Sep. 30, 2004, now U.S. Pat. No. 7,283,928. The disclosures of all of the foregoing are hereby incorporated entirely herein by reference.

BACKGROUND

1. Technical Field

Aspects of this document relate generally to computer analysis systems and methods used for analyzing data from an industrial, manufacturing, or business processes and identifying process data exceptions.

2. Background Art

Data analysis systems are conventionally utilized in combination with many industrial and commercial processes to collect and process information coming from the process. Data analysis systems conventionally receive sensor data, equipment performance information, product property information, and other information about the process that may be useful if stored. Determining what data and which variables measured in the process affect process output are common uses for conventional data analysis systems.

Process data historians have existed for a number of years. Process data historians are provided by a number of different manufacturers, but they all interface with the user by displaying trend charts, current values, etc.

Process data historians collect and store data such as flows, temperature, pressures, and even vibration levels. Users can then display this historical data using trend charts, displaying real or historical values numerically or with symbols, even allow users to set alarm limits so that numerical values or symbols change color, flash, etc. when alarm limits are exceeded.

Alarms are a term generally used in manufacturing to identify issues that must be addressed. An example is a tank level; if the tank contains crude oil to be refined, for example, it would be useful to know if the tank is nearly empty or nearly full. An alarm point of 95, for example, would alert the operator that the tank is nearly full. Likewise, an alarm level of 5 would indicate the tank is nearly empty. Generally, once a process variable, in this case, a tank level, meets or exceeds the alarm limit, the alarm continues until acknowledged.

There are many problems with current alarm methods. In the example cited above, the oil refinery may have shut down to perform maintenance. Consequently, the tank level is 0 because it has been drained so that repairs may be made. Other problems occur if the limits on alarms are too restrictive; they then become what are commonly called "nuisance alarms." Therefore, alarm limits are often so liberal that a problem is not identified in a timely manner.

SUMMARY

Aspects of this document relate to a computerized method for identifying process data exceptions. These aspects may comprise, and implementations may include, one or more or all of the components and steps set forth in the appended CLAIMS, which are hereby incorporated by reference.

In one aspect, a method for identifying process data exceptions in a process is disclosed that identifies all variables outside of limits that are continuously updated, based only on data when the process is running, as well as identifies the date of the exception. This allows for the identification of tags that might have caused the process (for example, as measured by a key performance indicator (KPI) such as cost for example) to deviate.

The method may calculate the average and coefficient of variation for a specified time slice in a data historian based on specified filter criteria.

The method may calculate the two sigma limits for both the "average" data as well as the coefficient of variation of each time slice.

The method may identify the tags or variables whose current value exceeds the calculated two sigma limits.

The method may identify the tags or variables whose average value for a given slice of time exceeds the calculated two sigma limits for evaluated all time slices.

The method may identify the tags or variables whose coefficient of variation (COV) for a given slice of time exceeds the calculated two sigma limits for evaluated all time slices.

The method may count the number of consecutive time slices a variable's average has been exceeding two sigma limits.

The method may count the number of consecutive time slices a variable's coefficient of variation (COV) has been exceeding two sigma limits.

The method may identify the degree to which a variable exceeds either the average or COV two sigma limit by calculating the number of standard deviations above the mean or the percent deviation above the high two sigma limit or the percent deviation below the low two sigma limit.

The method may identify the variables that exceed historical two sigma limits at the current time.

The method may identify the variables that exceed historical two sigma limits for a specified or archived time.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 10 and 10A illustrate a chart of data results;

FIG. 11 illustrates a summarization of trial block data;

FIG. 12 illustrates an array of data;

FIG. 14 illustrates a chart of exceptions; and

FIG. 15 illustrates a chart of filtered exceptions.

DESCRIPTION

Implementations provide a computerized method for identifying process data exceptions, and software for carrying out the method.

Figure 1A:
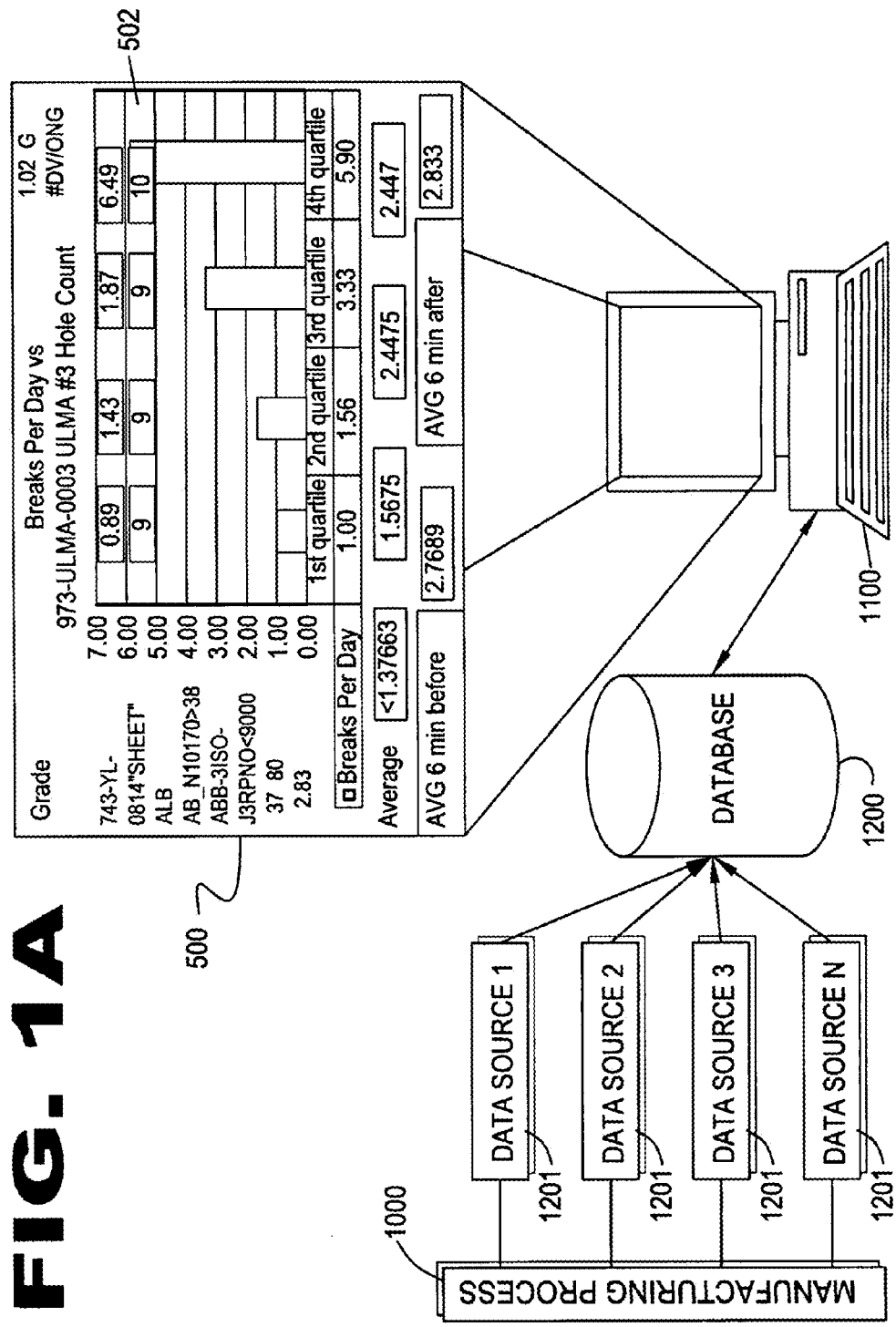
FIG. 1A is a block diagram of a computer system employing a computer program to perform a computerized method for data analysis.

Referring to FIG. 1A, the computerized method and software for data analysis is executed on a computer 1100, such as a typical personal computer or the like. The computer 1100 accesses data from a database 1200, including data obtained from at least one data source 1201 in communication with an industrial or manufacturing process 1000. Various methods of automating manufacturing equipment, and recording historical data derived from a manufacturing process 1000, are well known to those skilled in the art. Database 1200 thus contains a set of data representing historical operating parameters of an industrial process. Note that the database 1200 may be maintained within the computer 1100, or may be a separately maintained database, such as a database server accessed on a computer network.

The computerized method for data analysis involves inputting selected data from the database 1200 into the computer 1100. The selected data is organized into sample sets, such as all data samples collected in a single day. The selected data includes, within each sample set, at least one independent variable and one dependent variable, wherein the dependent variable is typically chosen to represent a fault condition, or a quality measure, production rate, speed, etc., within the manufacturing process 1000.

The sample sets are arranged, according to an independent variable, into distribution sets. In the illustrated implementation, the distribution sets are quartile sets, although the present invention is not limited to quartile distribution sets. The distribution sets are used to generate a graph displayed on the computer 1100 that relates independent variable data to the dependent variable, illustrating a correlation between the independent and dependent variables to aid in determining a cause and effect relationship.

Figure 1B:
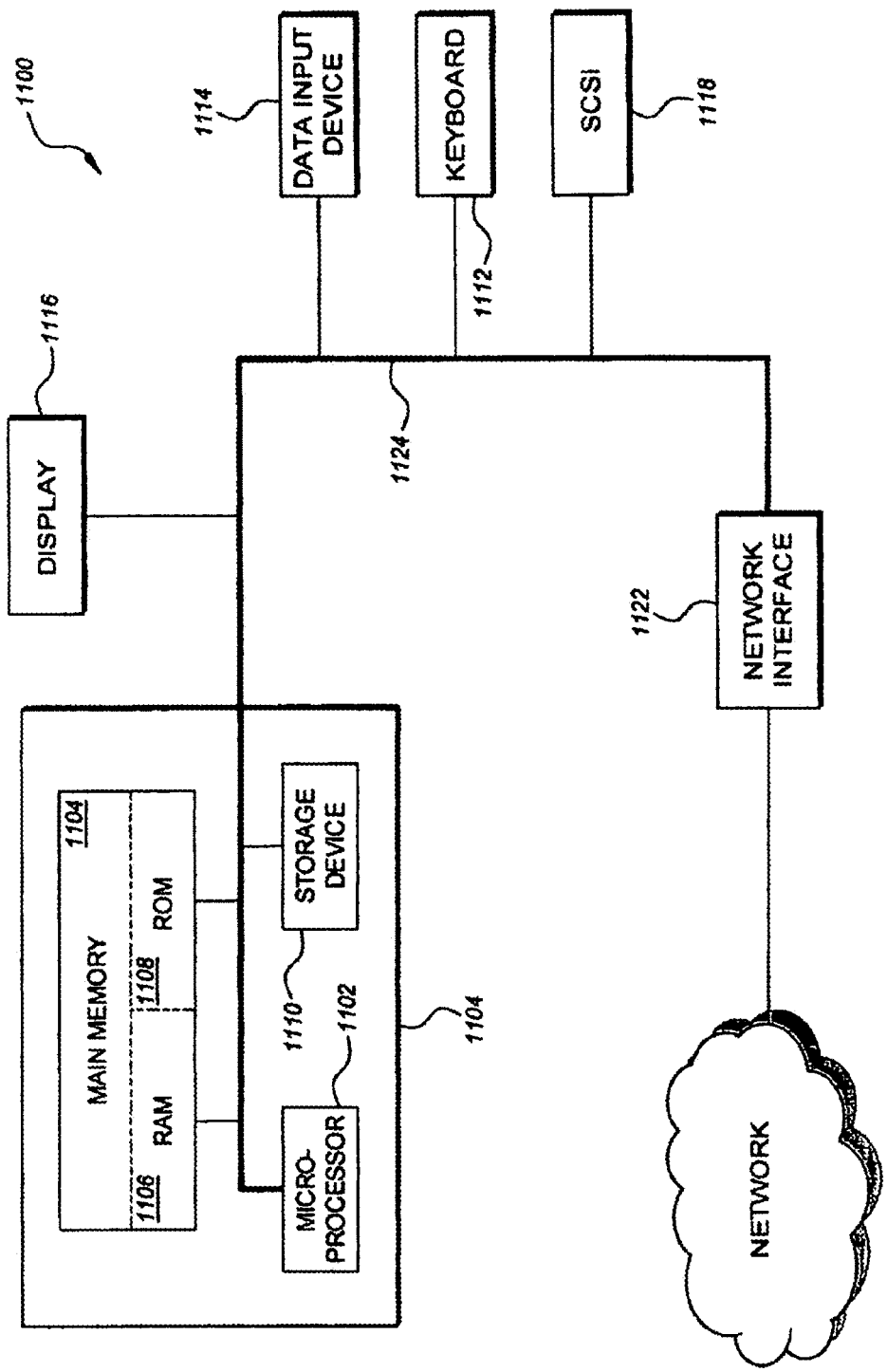
FIG. 1B is a block diagram of a computer system in which software for data analysis operates according to the computerized method for data analysis.

The computerized method for identifying process data exceptions comprises a computerized method implemented by software executing on a computer 1100. Referring to FIG. 1B, the computer 1100 is a general purpose or personal computer of a generally known and common configuration. Such a computer has a microprocessor 1102 connected by a bus 1124 to an area of main memory 1104, comprising both read only memory (ROM) 1108, and random access memory (RAM) 1106, and a storage device 1110 having means for reading a coded set of program instructions on a computer readable medium which may be loaded into main memory 1104 and executed by the microprocessor 1102. The computer 1100 has a display device 1116, a keyboard 1112, and may include other input devices 1114 such as automating devices in communication with the manufacturing process 1000, a mouse, joystick, etc. A network communication interface 1122 is provided for serial communications on a network or other serial communications link. Additionally, the computer 1100 may include a Small Computer System Interface (SCSI) adapter 1118 for communication with peripheral devices, including data sources 1201 such as automating devices in communication with the manufacturing process 1000.

Figure 2A:
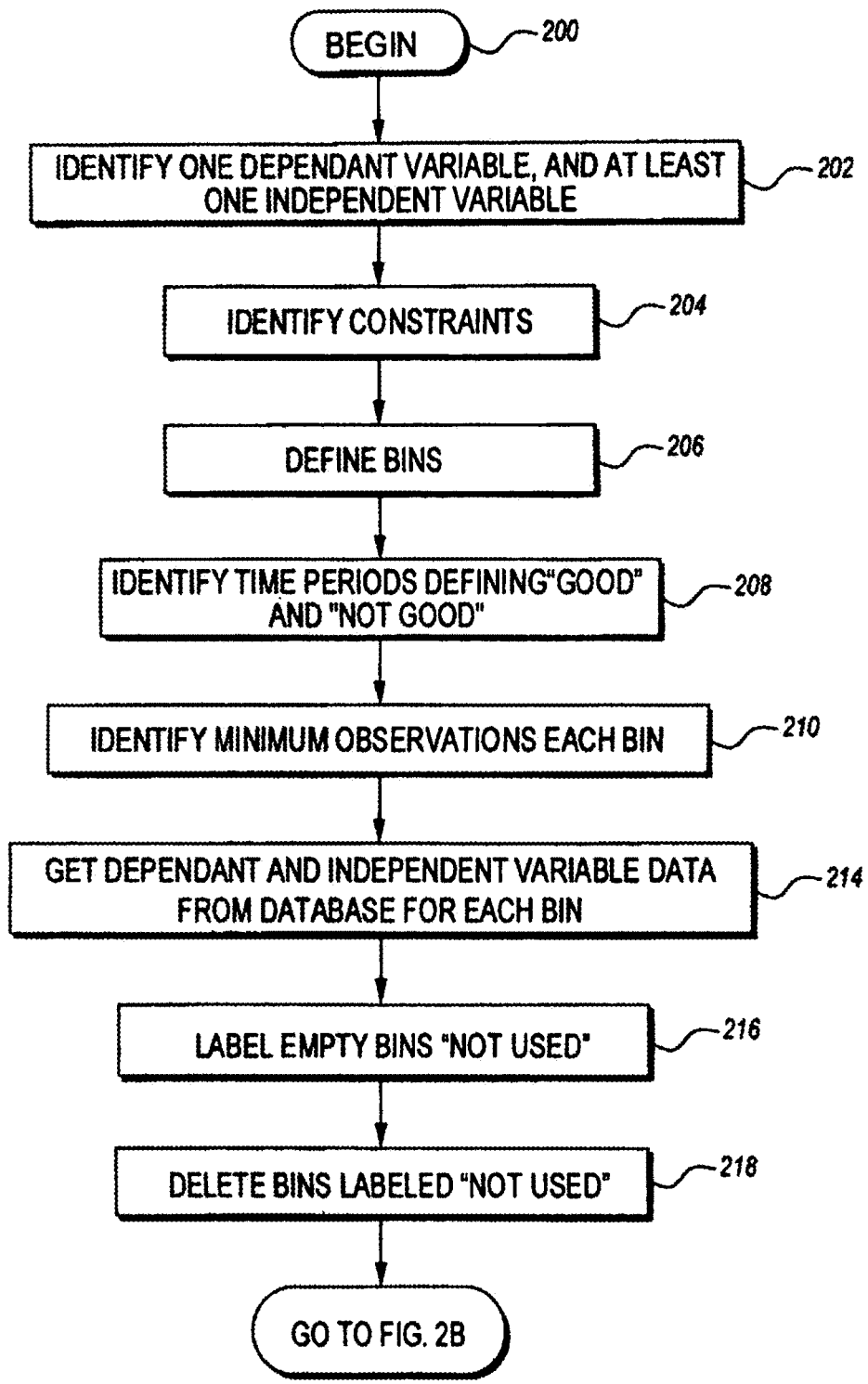
FIGS. 2A and 2B are a flow chart of a computerized method for data analysis.
Figure 2B:
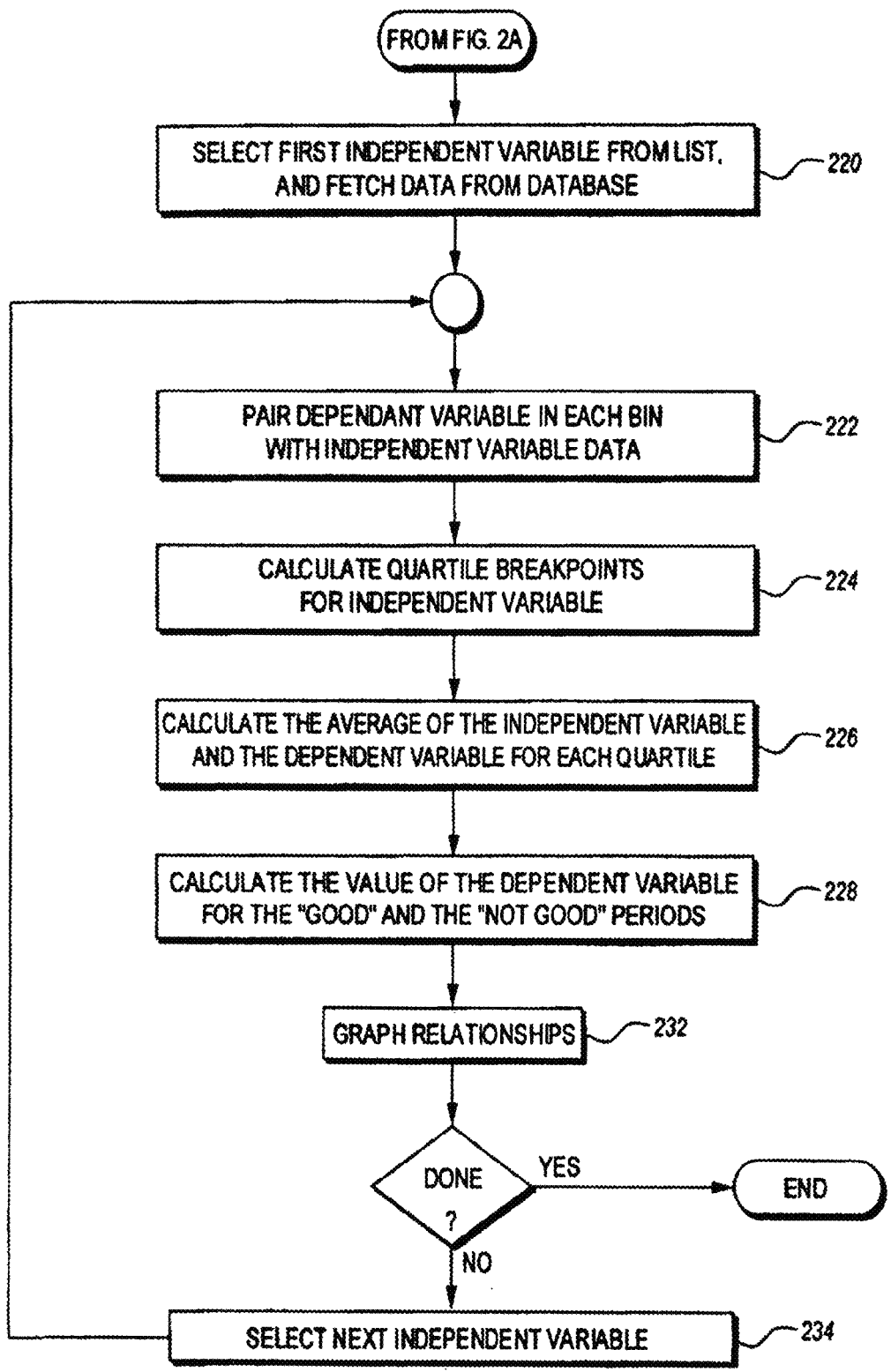
Figure 3A:
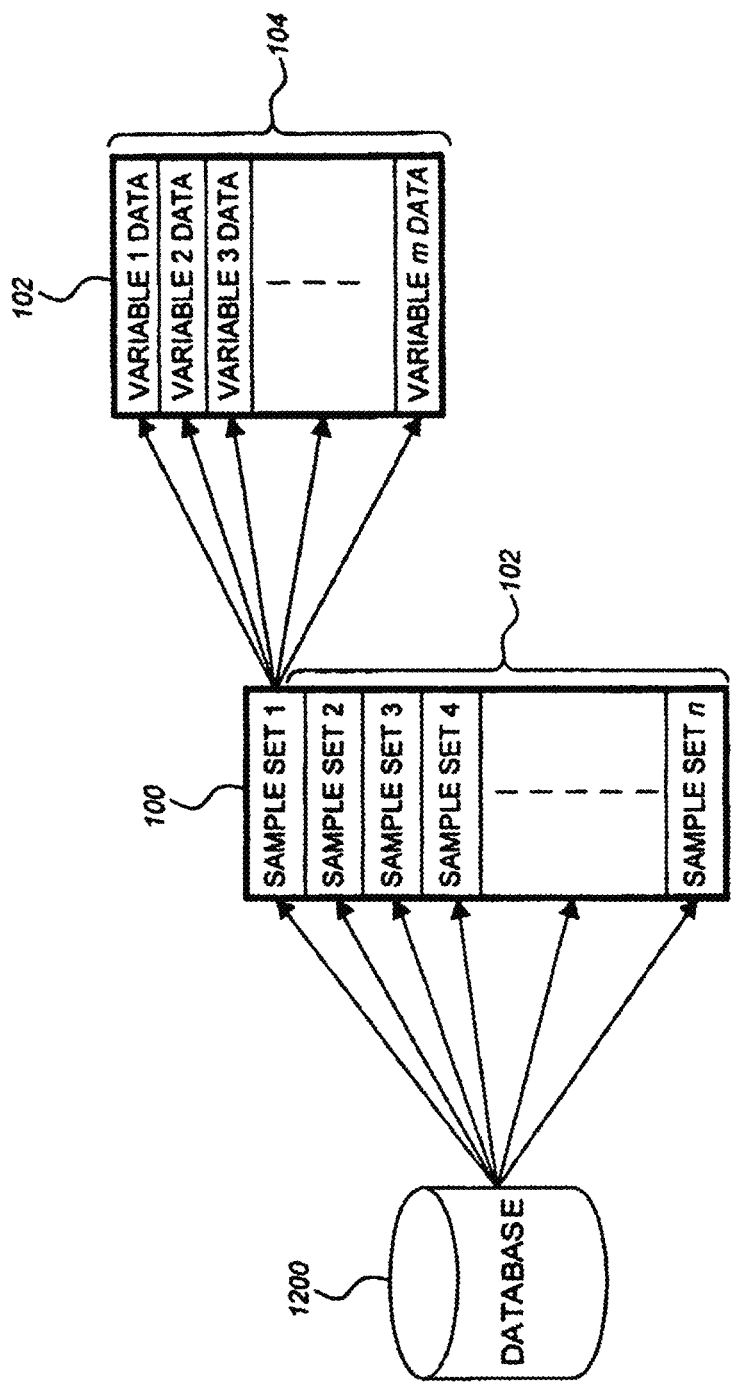
FIGS. 3A, 3B and 3C are block diagrams depicting a data transformation from raw historical data to filtered data organized into bins for analysis.
Figure 3B:
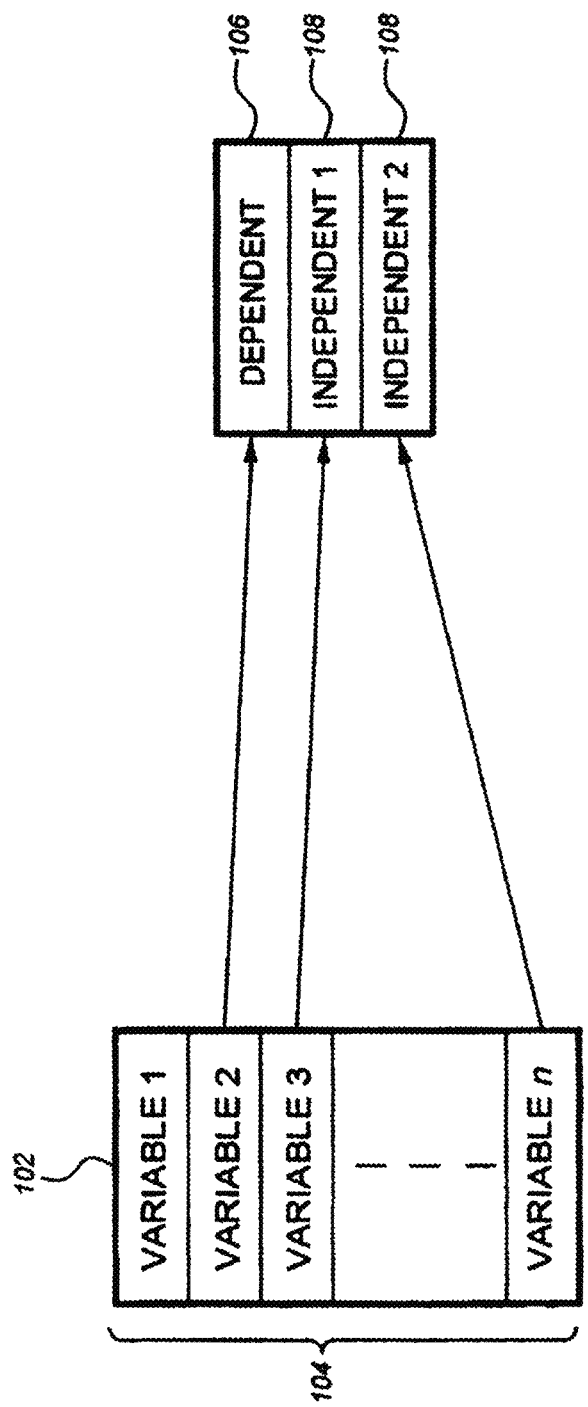
Figure 3C:
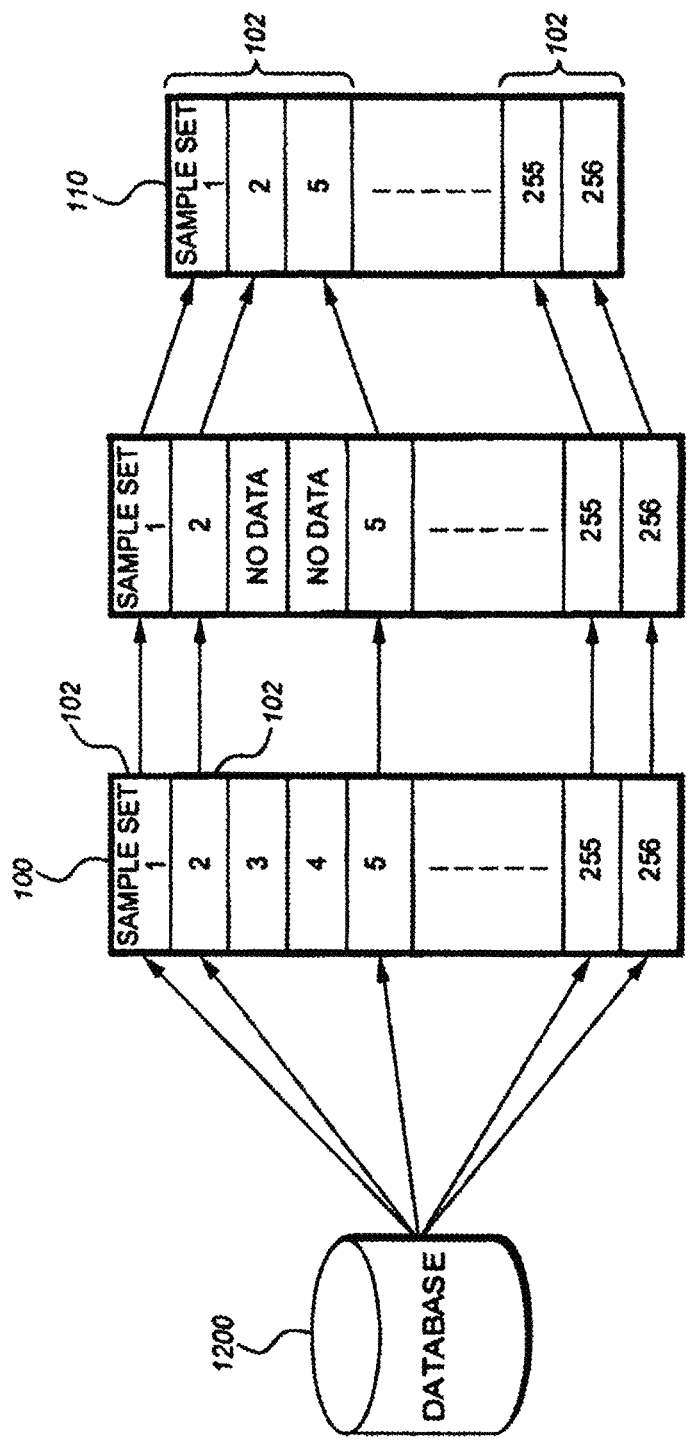

Turning now to FIGS. 2A and 2B, a flowchart illustrates the computerized method for data analysis is described in greater detail. Referring particularly to FIG. 2A along with FIGS. 3A, 3B, and 3C, the process begins, at step 200, with a series of steps wherein a user enters information relating generally to identifying the data to be analyzed, and the data is retrieved accordingly from the database 1200. The database 1200 contains data samples for a number of variables spanning a statistically useful historical time period. For the purposes of analysis, the data samples are organized into a raw collection 100 of sample sets or "bins" 102, each bin 102 being a uniform portion of the historical time period, such as a day or an hour. Within each bin 102 are data samples for several of the data variables 104. One of the data variables is designated as the dependent variable 106 (step 202), the dependent variable generally being a variable related to a particular fault condition, or a quality measure, production rate, speed, etc., within the manufacturing process 1000. At least one of the variables is designated as an independent variable 108. Constraints are identified for the dependent variable 106 and the independent variable 108, such as minimum or maximum values, or a range of data considered useful or desirable for a particular analysis (step 204).

Bins 102 are defined by setting the size and number of the bins desired for analysis. For example, each bin 102 might be defined to contain a day's worth of data samples, and two hundred and fifty six (256) bins 102 might be used (step 206). Also, a minimum number of samples may be specified for the bins 102. In addition to the bins 102, a time period may be identified to define a period of "good" process performance versus a period of "bad" process performance (step 208).

Once the bins 102 have been defined, data for the dependent variable 102 and the independent variable(s) are retrieved from the database for each of the bins 102 (step 214), according to the constraints that were defined by the user. Note that the dependent variable 106 might be represented within a bin 102 as a single data value (such as the count of an event occurring within the time frame of a bin 102), or as a number of data samples (such as a periodic sampling of a parameter within the time frame of a bin 102). If the dependent variable 106 is represented as a number of data samples, the average value for the number of data samples within a bin 102 is determined, along with a coefficient of variation, and recorded as the dependent variable value. As a result of the data constraints applied to the data retrieved from the database 1200, some of the bins 102 may have no data. Bins 102 with no data, or bins 102 that contain less than a specified minimum number of samples, are marked (step 216) and deleted (step 218). As an alternative, in addition to deleting the bins 102 that have been marked, new bins 102 may be identified within the database 1200 to replace the deleted bins, maintaining the desired number of bins 102. The result is a cleaned collection 110 of bins 102 that contain valid and relevant data for the dependent variable 106 and the independent variables 108.

Figure 4:
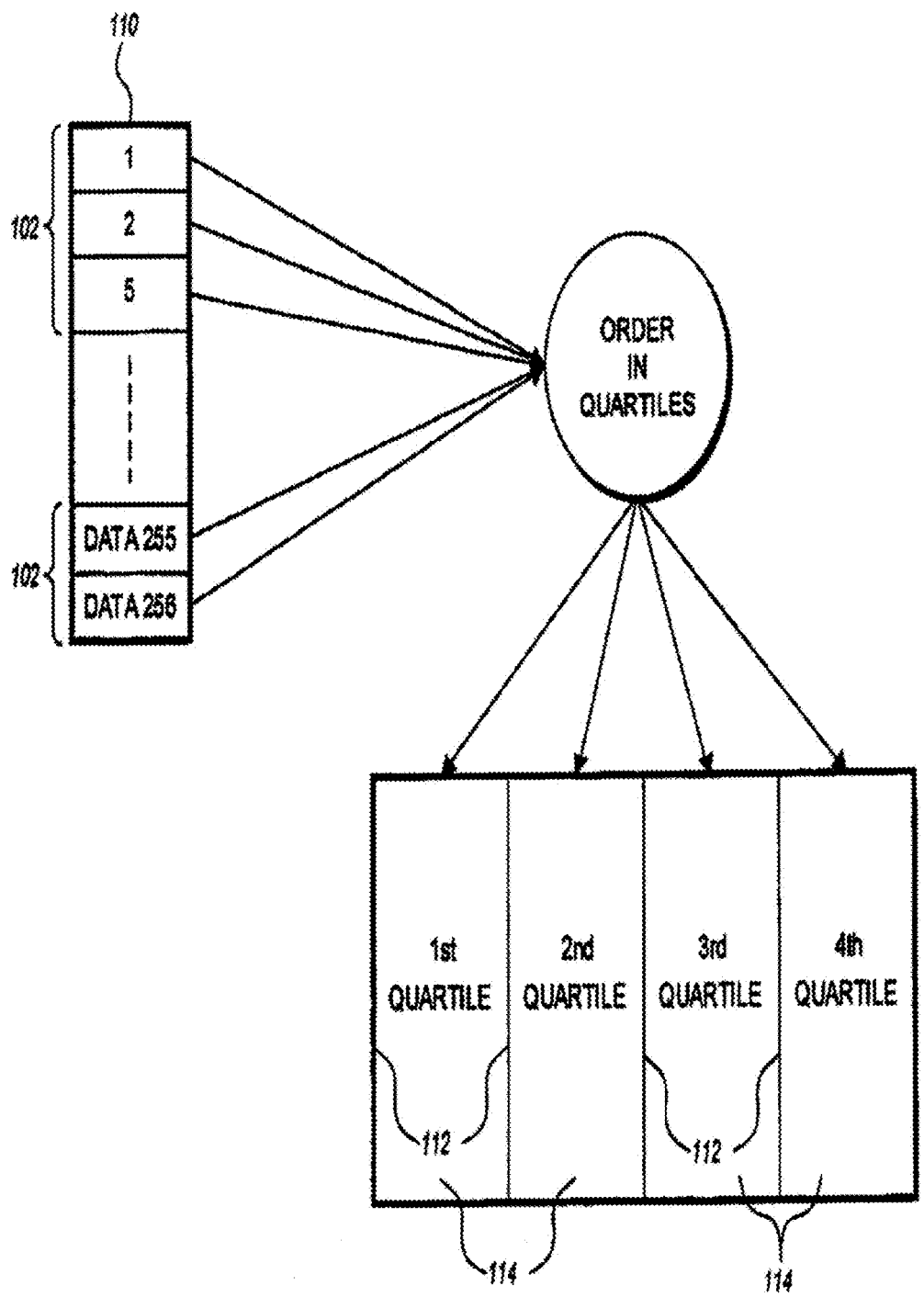
FIG. 4 is a block diagram depicting a data transformation from historical data organized in bins into a quartile distribution of the data.

Turning now to FIG. 2B, along with FIG. 4, the bins 102 are ranked according to an independent variable 108, and separated into a plurality of distribution sets 114, and a graph is produced to visually relate the dependent variable data to the independent variable data. The bins 102 may be ranked by the average value of the independent variable 108 within each bin, or by the coefficient of variation of the independent variable 108 data within the bins, or both. In the implementation illustrated, the distribution sets 114 consist of four (4) quartile sets. This is repeated for each independent variable 108.

At step 220, a first independent variable is selected from a list of the independent variables identified previously at step 202. The bins 102 are then ordered into an ascending (or descending) series according to the independent variable data (step 222), using the average value or the coefficient of variation for each bin 102. The independent variable data is then used to calculate breakpoints 112 that divide the series of bins 102 into a plurality of distribution sets 114 (step 224). The distribution sets 114 may be determined to contain approximately the same number of bins 102, or may be determined by another criteria, such as a weighted distribution of the independent variable data. For each of the distribution sets 114, the average value of the independent variable 108 and the average value of the dependent variable 106 are determined (step 226). Additionally, a coefficient of variation may be determined for the independent variable 108 and for the dependent variable 106.

In addition to the distribution sets 114, data values or averages may be determined for the "good" and "not good" periods defined previously (step 228).

Figure 5:
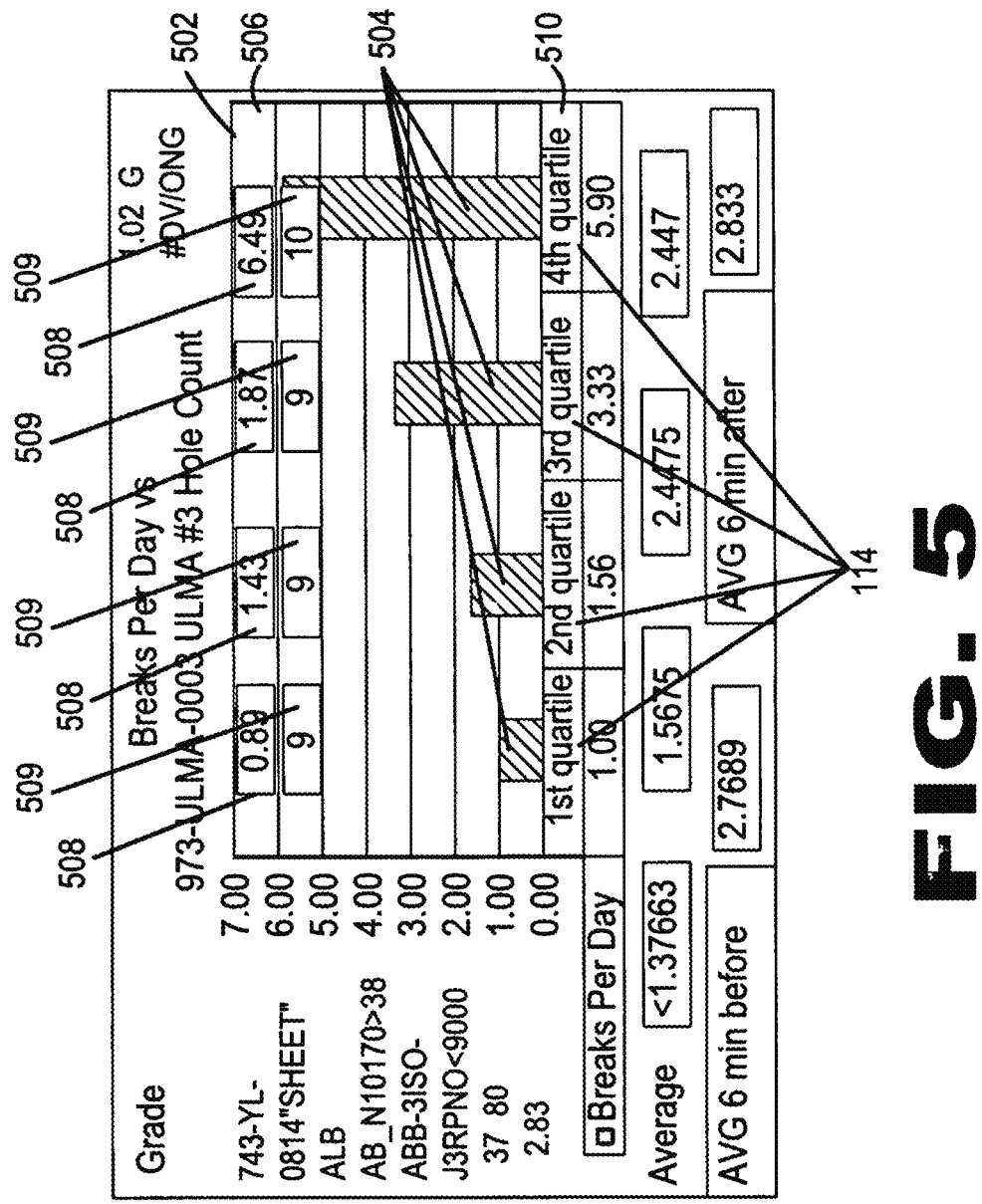
FIG. 5 is a screen shot illustrating a quartile distribution of an independent variable and its mapping to dependent variable data.

A graph is generated to visually associate the independent variable 108 and the dependent variable 106 average values. Referring to FIG. 5, a display image 500 is shown including a bar graph 502. The bar graph 502 includes a vertical bar 504 for each of the distribution sets 114, the vertical extent of each bar 504 indicating the average value for the dependent variable 106 within the associated distribution set 114. Along the top of the bar graph 502, an independent variable legend 506 displays the independent variable average value 508 for each of the distribution sets 114. A bin count legend 509 displays the number of bins 102 within each of the distribution sets 114. Note that a graph may be derived from either the average value or the coefficient of variation of the independent variable within each bin 102.

If additional independent variables 108 were identified, the next independent variable is selected (step 234) and the process repeated from step 222.

The bar graph 502 depicted in FIG. 5 shows a number of breaks per day in a paper manufacturing process verses a hole count, wherein breaks per day refers to breaks in the paper product web, while the hole count is a count of holes in the paper product web at a particular point in the paper manufacturing process. It can be recognized, by inspection of the bar graph 502, that there is a correlation between the breaks per day and the hole count. A fourth quartile 510 distribution set 114, which contains the highest independent variable values, also indicates the highest number of breaks per day.

Figure 6:
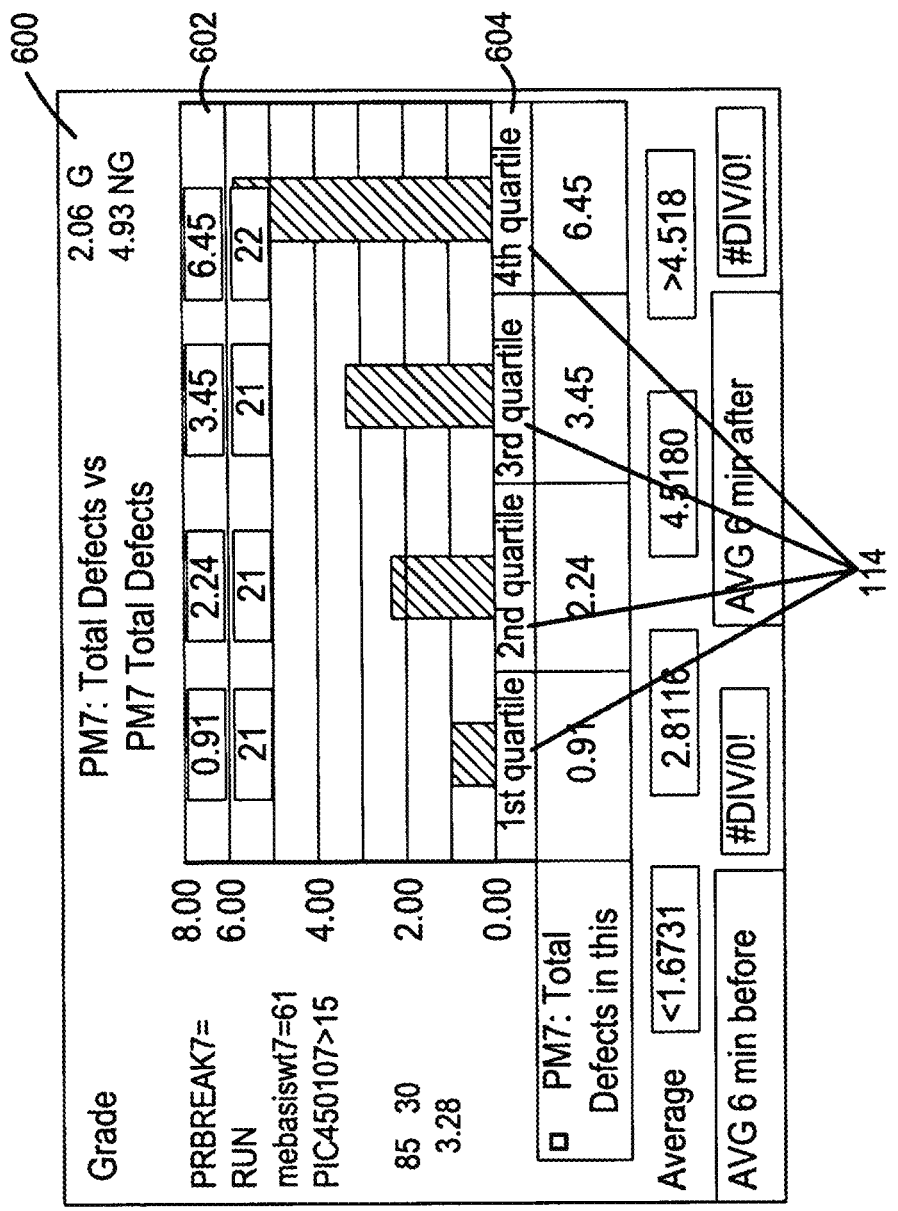
FIG. 6 is a screen shot illustrating the comparison of a dependent variable to itself to obtain a quartile distribution of the dependent variable.

Turning now to FIG. 6, a special case is illustrated wherein the same variable is selected as both the dependent variable 106 and the independent variable 108. The resulting display image 600 includes a bar graph 602 that depicts a distribution of the dependent variable across the quartile distribution sets 114. The bar graph 602 depicted in FIG. 6 ranks the variable "Total Defects" into quartile distribution sets 114. It is worth noting that this distribution identifies the "worst case" 604 among the distribution sets 114 for the dependent variable 106. Thus, it is useful to know that no other independent variable 108 can have a single distribution set 114 with a greater dependent variable 106 average value, unless the distribution set 114 based on a different independent variable 108 contains fewer bins 102.

It can be recognized that, once distribution sets 114 are determined for a given independent variable 108 and a given set of defined constraints, the distribution sets 114 and their associated average and coefficient of variation values for the independent variable do not change for subsequent analyzes utilizing different dependant variables 106, except for generally trivial changes that may result if, for example, pairings of independent variable 108 and dependent variable 106 samples result in slightly different distribution set 114 breakpoints. This allows for the comparison of multiple graphs, based on several dependent variables 106 each graphed against the same independent variable 108 distribution sets 114, to reveal causal relationships among the variables rather than a mere correlation.

Figure 7:
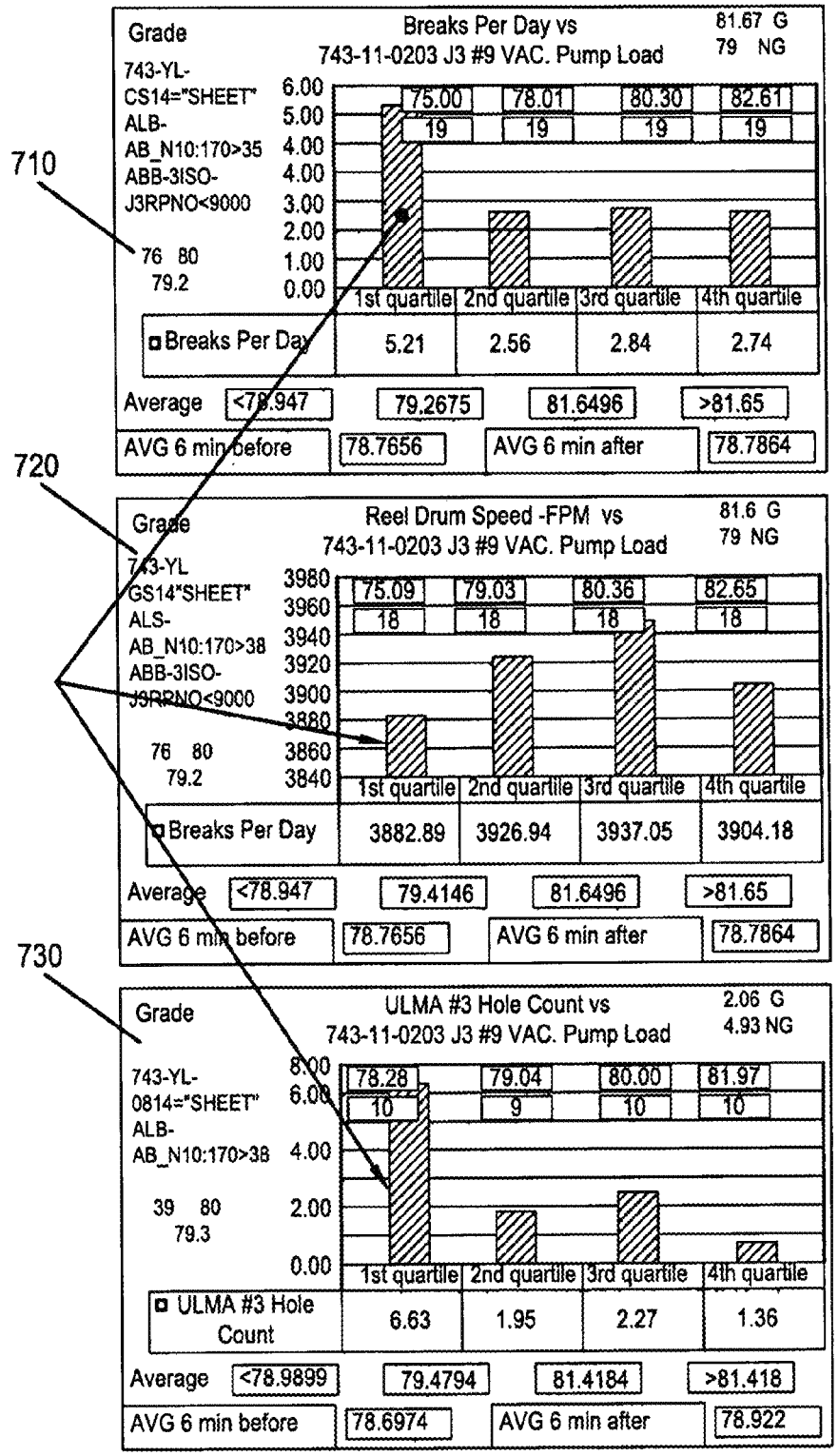
FIG. 7 illustrates the graphical relationship between multiple analyses showing a correlation between a dependent variable and at least one independent variable.

Turning to FIG. 7, it is shown that the computerized method for data analysis provides great insight into cause and effect relationships when multiple graphs are produced to discover relationships between multiple dependent variable 106 and independent variable 108 parings. In the example illustrated in FIG. 7, a paper manufacturing process for producing a manufactured paper web is analyzed to determine a cause of excessive paper breaks within the process in a day. Data collected from the paper manufacturing process includes the number of paper breaks per day, a measured vacuum pump load, a reel drum speed, and a count of holes found in the manufactured paper web (hole count). In each of three analyses, the measured vacuum pump load ("#9 VAC. PUMP LOAD") is used as the independent variable 108. In a first analysis, wherein the computerized method for data analysis results in graph 710, the number of paper breaks per day ("Breaks Per Day") is chosen as the dependent variable 106. The resulting graph 710 reveals that the breaks per day are correlated with a low vacuum pump load.

Additionally, in a second analysis, wherein the computerized method for data analysis results in graph 720, the reel drum speed ("Reel Drum Speed-FPM") is chosen as the dependent variable 106. The resulting graph 720 reveals that the real drum speed is also correlated with a low vacuum pump load. Finally, in a third analysis, wherein the computerized method for data analysis results in bar graph 730, the hole count ("#3 Hole Count") is chosen as the dependent variable 106. The resulting bar graph 730 reveals that the hole count too is correlated with a low vacuum pump load.

It follows that, while a comparison of breaks per day against reel drum speed and against hole count may indicate a correlation, the presentation of multiple analyses, effectively holding constant the independent variable across each analyses, reveals with a significant degree of confidence an actual causation of the paper breaks. More particularly, in this example, one proceeds to calculate the speed for the low vacuum pump load because paper breaks might have been caused by high speed; "freezing" the quartiles tells those skilled in the art that, in fact, the speed was the lowest in this quartile. Thus, high speed is not causing the breaks.

This method of "freezing the quartiles" also effectively identifies how human and control policies corrupt historical data. For example, if slow speed is associated with high break counts, it could be due to operators slowing down when they have problems. The fact that "slowing down" does not "fix" the problem tells one that taking action is not a "lever" with which to control breaks.

Additional graph types can be utilized as part of the analysis process as aids in identifying variables that impact a particular variable of interest, such as breaks per day. These graphs may be constructed using historical data from a process obtained by and stored in a data historian. Using historical data from a data historian coupled with a process, stored historical data may be obtained using the data historian that includes a variable of interest and one or more other process variables or "tags." In particular implementations of data analysis systems, a set of bins may be defined which may be used to retrieve stored historical data that matches criteria corresponding with the particular bin (such as, for example, historical data collected on a particular day). One or more filters may be employed in particular implementations to retrieve filtered historical data from the bins that corresponds with any of a wide variety of filter criteria, such as, by non-limiting example, duration, frequency, value, date, vendor, and trial, and any other variable or parameter that can be used to differentiate data values. Relevant teachings regarding data historians, bins, and filters can be found in the U.S. Utility patent application to John Antanies entitled "Computerized Method for Creating a Cusum Chart for Data Analysis," application Ser. No. 11/691,871, filed Mar. 27, 2007, the contents of which were previously incorporated by reference. Data historians may include any of a wide variety of database types and formats, such as, by non-limiting example, the PI System™ marketed by OSIsoft®, IP.21 marketed by AspenTech®, a flat file database, a non-relational database, a text file, a relational database, or any other system and/or format capable of storing historical data.

An example of such a graph is a CUSUM chart. CUSUM stands for "cumulative sum" and provides a way to develop a control chart where each point on the chart depends in part upon the value of the previous point. Conventional Shewhart control charts consist of plotted points where the location of each point does not involve any calculation involving any previously plotted points. Because of this, Shewhart control charts generally lack the ability to quickly detect shifts in the process mean less than 1.5 standard deviations in size. CUSUM charts, on the other hand, are capable of signaling sooner than Shewhart charts when process shifts in this range occur. A CUSUM chart is a plot of the cumulative sum of deviations of process values from a target or historical mean value. Equation 1 illustrates the general formula for calculating each point on a CUSUM chart:

$$C_i = \Sigma_{j=1}^{i} (\bar{x}_j - \mu_0) \quad (1)$$

Where $C_i$ is the ith point on the CUSUM chart, j is the number of samples, $\bar{x}_j$ is the average of each of the individual values within a single sample (or the individual value of the sample if only one measurement is taken), and $\mu_0$ is a target value for the variable being plotted on the chart (or a historical average value of that variable). As a practical matter, Equation 1 can be simplified into a formula that yields the value of each point on the CUSUM chart as a function of the point immediately before it ($C_{i-1}$):

$$C_i = (\bar{x}_i - \mu_0) + C_{i-1} \quad (2)$$

When only individual data points are used for each sample, a CUSUM chart can be constructed by subtracting the target value from the ith data point and adding the result to the value of the last point on the chart. Because the deviation between the current point and the target is added to the value of the last point the chart, a shift in the process mean quickly manifests itself as a steadily rising or falling trend on a CUSUM chart (depending upon whether the shift was upward or downward from the target value). The point or set of points on the CUSUM chart at which the rising or falling trend begins can be referred to as an inflection point. Because the date of the data point corresponding with the inflection point represents a "turn on" date for a process shift, valuable information can be obtained by evaluating what other process variables (sometimes represented within the data set by corresponding "tags") shifted close to the same time. While in certain implementations of data analysis systems and related methods disclosed in this document, CUSUM charts can be monitored using control limits like conventional Shewhart control charts (often using a tabular CUSUM chart or a V-mask), the CUSUM charts in many other implementations will most often be used to identify inflection points, or turn-on dates, for shifts in particular variables. Additional information regarding the structure, use, and function of CUSUM control charts may be found in *Introduction to Statistical Quality Control*, Douglas C. Montgomery, 4th Edition, Chap. 8 (John Wiley and Sons, 2001), the relevant disclosure of which is incorporated herein by reference.

Figure 8:
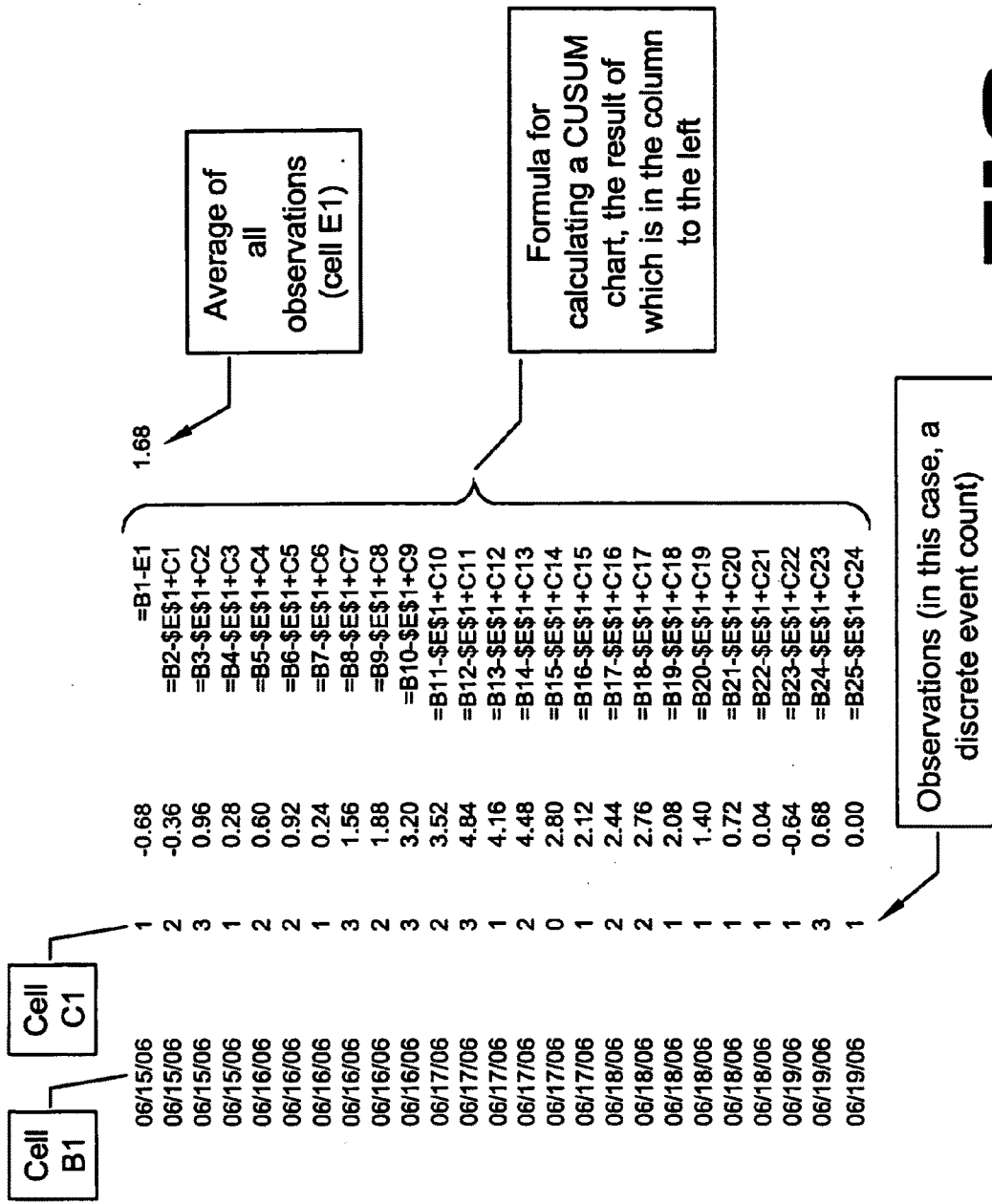
FIG. 8 illustrates an example of calculations for developing a CUSUM chart, as known in the prior art.
Figure 9:
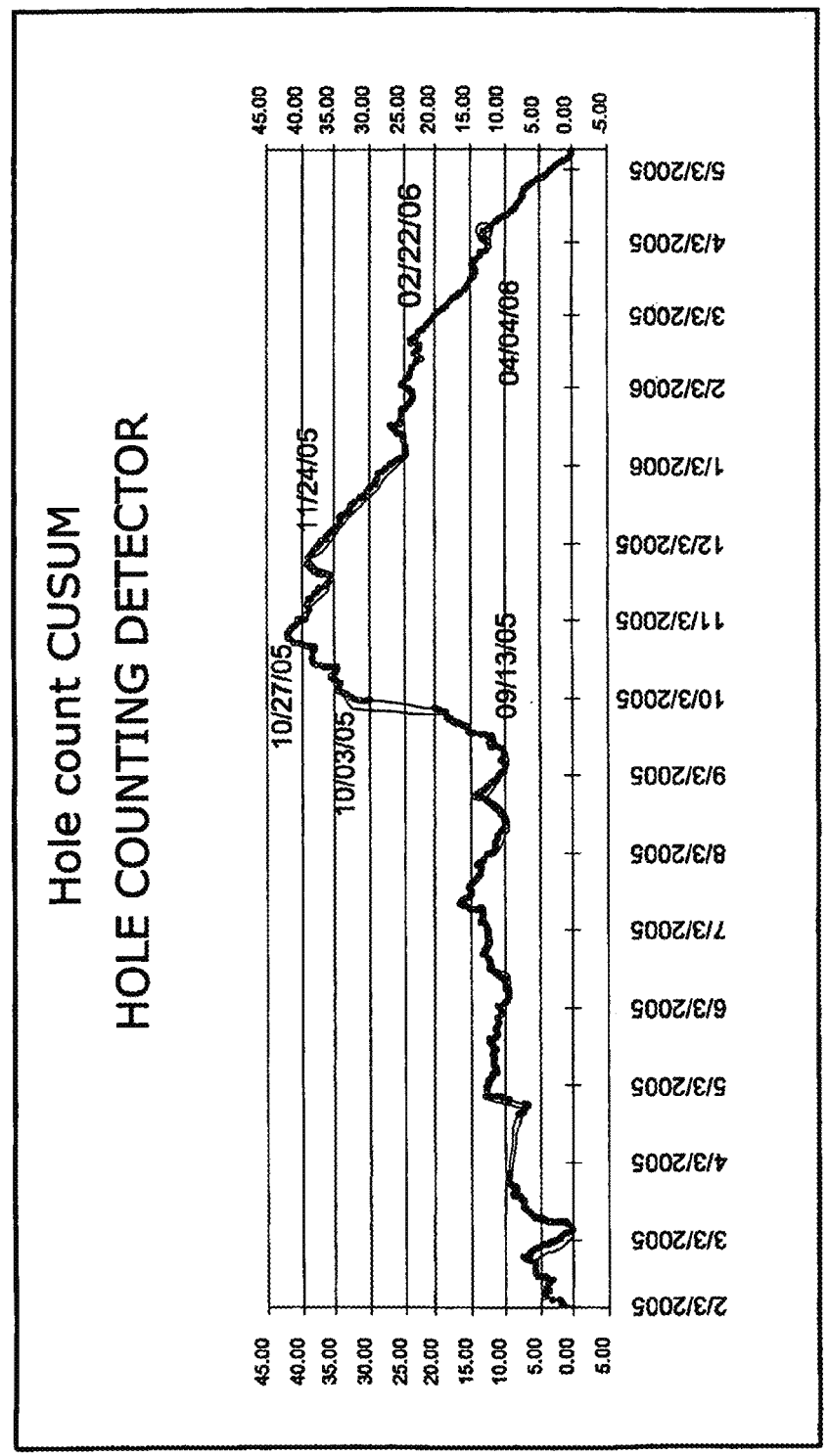
FIG. 9 illustrates is a CUSUM chart of hole counts on a paper machine, which graphically illustrates that hole counts peaked on Oct. 27, 2005, and have since been below average.

An example of calculations for developing a CUSUM chart, as known to the prior art, is seen in FIG. 8. Referring to FIG. 9, an example of a CUSUM chart of hole counts on a paper machine is illustrated. The CUSUM chart shows that, on Sep. 13, 2005, the hole count went from average to well above average, as indicated by the line going upwardly at a steep angle. On Oct. 27, 2005, the hole count reversed and suddenly became lower than average. The "hole count" is shown in the CUSUM chart to have continued to be lower than average after Oct. 27, 2005, because the slope of the line shown is negative. Thus, FIG. 9 graphically illustrates that hole counts peaked on Oct. 27, 2005, and have since been below average. It also illustrates potential inflection points on Sep. 13, 2005, Oct. 27, 2005, and Nov. 24, 2005.

CUSUM charts may be automatically generated for each variable of interest, then each inflection point may be manually or automatically identified and output to a table or database. Once the dates of the inflection points have been determined and/or calculated for each variable of interest, variables that may have influenced or caused a shift in a particular variable at a particular inflection point for that particular variable can be identified in at least two ways. The first is to prepare a table of process variables listing each variable's inflection points and then compare the dates to see which variables had the same or correlating inflection point dates. The second is to prepare a set of CUSUM charts where in each CUSUM chart, a line is plotted for the variable of interest and another line is plotted for one of the other process variables (often represented as a "tag"). In this way, an overlay CUSUM chart is formed for each process variable or tag that could affect the variable of interest. By visual inspection or automated analysis, variables or tags exhibiting similarly timed inflection points as the variable of interest can be identified and potential causes of the process shift corresponding with the movement of the corresponding variables investigated.

Thus, it can be seen that the computerized method for data analysis results in a graphical presentation of data gathered from a manufacturing process to reveal a causation of a fault condition, or a quality measure, production rate, speed, etc., within the manufacturing process.

The method will be further explained by way of an example, in which a trial period for a manufacturing/production process is to start on September 12th and run for ten days through September 22nd. These are the "start" and "stop" dates of the trial period. The selected "time slice" is to be one day. The "filter criteria" could be any of one or more production variables, such as speed, product/grade, temperature, etc.

Empirical analysis in our example has determined that the filter criteria were met on each of September 13rd; September 14th; September 15th; and September 17th, and the data from these dates would be included in the "trial block." It should carefully be observed that there are only four "slice blocks" (or four days, since each time slice is one day in this example) included in the trial block, even though the trial period lasted a full ten days. This is because the other six days, or six other time slices, did not run under, or meet, the filter criteria, as defined by those persons analyzing the efficiency of a given manufacturing, or other industrial, process.

Figure 10:
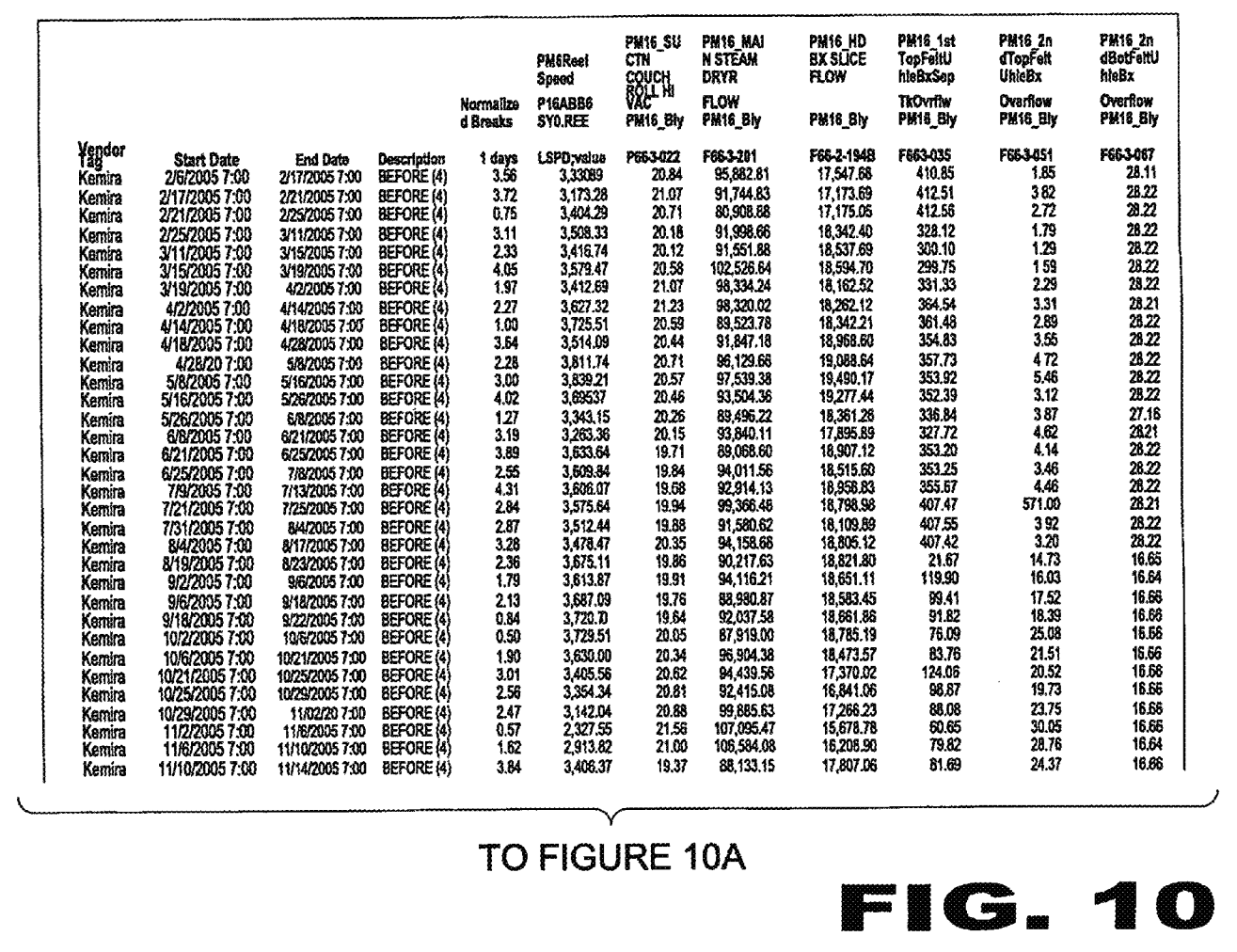
Figure 10A:
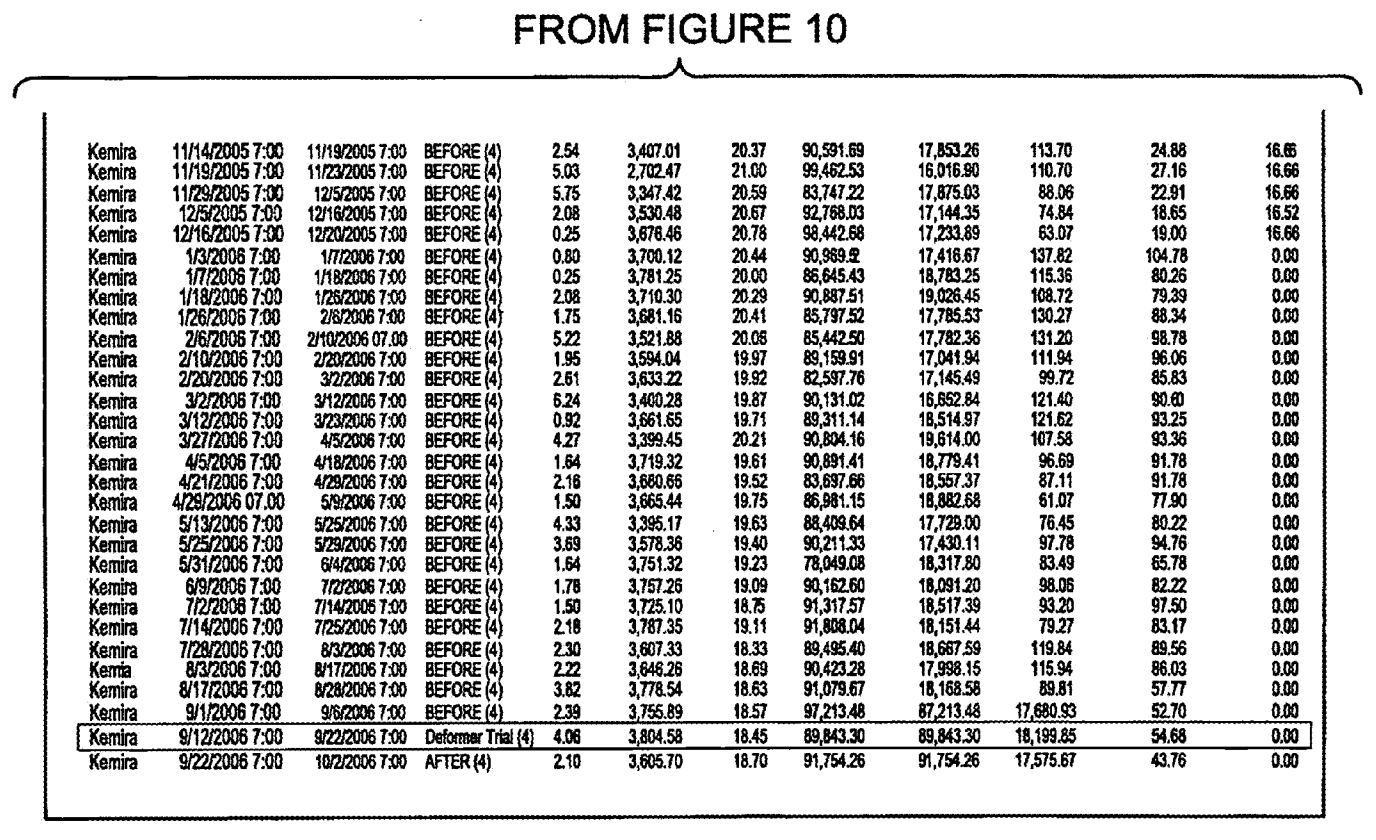

The process then proceeds by grouping all other observed slices (there being 62 "other observed slices") into four slice blocks. The process continues by ranking the data measured during the trial period against the data observed in each of the other 62 slice blocks. A chart of what such a result might look like is seen in FIGS. 10 and 10A where FIG. 10A is a continuation of FIG. 10. The data in the box (one line from the bottom of the example) is the "trial block." The number"4" represents the number of slices in the block—since the trail is 4 slices of data, we group all slices into 4 slice blocks. Those blocks that occurred after the trial are labeled "after," while those blocks that occurred before the trial are labeled "before."

The trial block data (from FIG. 10A) in this example is summarized in FIG. 11. The first circle indicates that data obtained during the trial block had an average of 4.06 breaks per day (e.g., sheet breaks on a paper machine.) The second circle indicates that 89% of all other blocks had less breaks than this trial block. Since the object is fewer breaks—not more breaks—this result would mean that the trial was probably not successful.

The 87% below the second circle indicates the statistical probability that the trial block was, indeed, different. The remainder of the columns compare other variables. For example, the second column indicates that 97% of all other blocks had a lower speed that the trial block—a potentially mitigating circumstances—as a well as a benefit.

Many industries use "data historians" to compile and store historical process and test data. These data historians allow users to filter data based upon speed, temperature, grade/product, etc. What the prior art fails to do is to provide a means for calculating discrete events based on conditional events using the stored history. These historians return data in arrays. Consider the array seen in FIG. 12. The method allows for the creation of a mathematical function that counts the first change in state from "good" to "bad." In the data array presented in FIG. 12, "0" is "bad" performance and "1" is good performance. The first column of dates, from 3:00 am on Jul. 28, 2006, until 7:00 pm on Jul. 28, 2006, had three of these "changes of state," which is shown in the shaded box. A user may also specify that a particular number of "good" observations be detected, after going from "good" to "bad" before another incident is counted. In the way, an aberration in one reading will not necessarily trigger a "change of state" determination. For example, in the above data array, if the minimum observations to "reset" the counter is 2, then the count in the first column would be 2, since the third "0" had only one "1" before it. This count, or detected "change of state," could also be based upon elapsed time. This means for creating a mathematical function that counts changes of state may be termed "ex post facto calculation" of a change of state that uses historical process data.

The method may involve the counting of breaks or discrete events based on the duration of the defect. For example, counting only those breaks that last at least 30 minutes. Or counting the breaks that are less than 40 minutes. Or counting the breaks that are more than 10 minutes, but less than 60 minutes. And, finally, not counting a new defect/break until the defect has been absent for at least 10 minutes.

Finally, a CUSUM chart, as well known to the skilled artisan, is a standard statistical method used to detect subtle, but significant, changes in a variable, as discussed earlier. When used to measure machine efficiency, or other parameter measuring performance of a machine or process, etc., a CUSUM charts shows precisely when performance changed.

Figure 13:
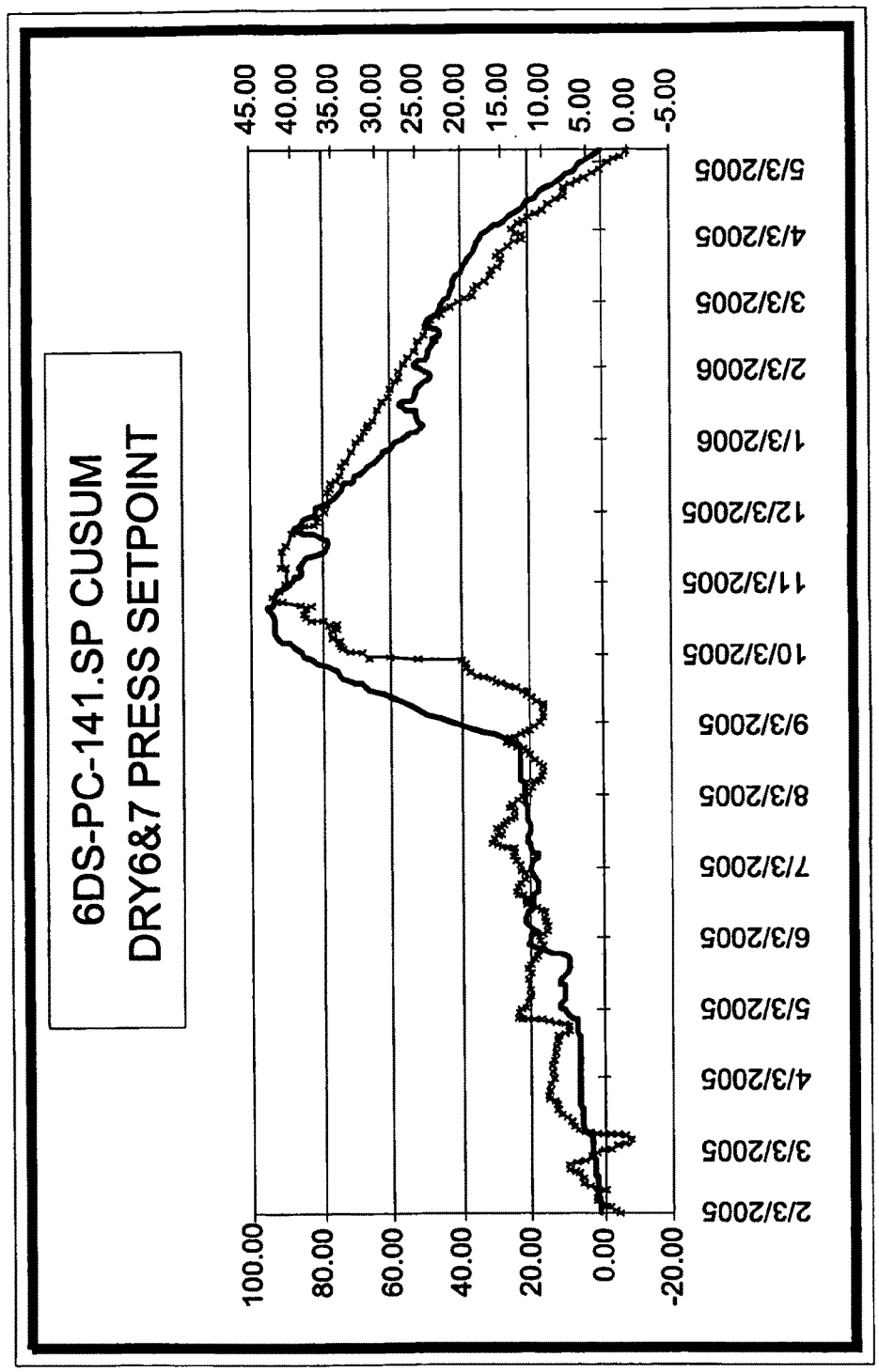
FIG. 13 illustrates an example of overlaying CUSUM charts.

By overlaying CUSUM charts, which may be developed according to the method of the present invention, correlation (if not necessarily causation) can be used to aid in identifying changes of state and, potentially, why sure changes in state occurred. Knowing, for example, that two particular parameters may have shown coincident changes may assist in determining causation. FIG. 13 is an example of overlaying CUSUM charts.

The computerized method for identifying process data exceptions solves the problems of conventional alarm methods by utilizing a method of identifying time slices that meet certain criteria. These time slices identify when certain operating conditions exist, similar to a database query, except the values for a process variable (such as tank level) are calculated for each slice. If the slices are one day "buckets" of time, the data set grows by one day. Or, perhaps the data set is fixed to a certain number of slices. In any event, the various statistics can be calculated.

One such statistic is standard deviation. If data is normally distributed, 95% of all observations of that variable will fall plus or minus two standard deviations from the mean (average). We call the value of the mean plus two standard deviations the "high" limit and the mean minus two standard deviations the "low" limit. Of course, the low limit could be 3, 4, or even six standard deviations. Each day when the software is updated, the high and low limits may change, and of course, if a variable exceeds the high limit long enough, it will, in effect, cause the limit itself to increase, since it is constantly recalculated based on new incoming data.

Once we have identified the high and low limits of a variable, it is now possible, by using a microprocessor, to examine every variable in a manufacturing process and identify which variables exceed the alarm limits, in effect, creating an "exception" report of all variables that are outside of their historical norms.

In a manufacturing process there may be thousands of variables; depending on the situation, our list of exceptions may number over 100. Therefore, we need a way to prioritize these. We can prioritize by calculating the percentage the variable exceeds the high or low alarm (limit). Or perhaps we simply calculate the number of standard deviations above or below the mean. We can then rank order these by this percentage or by the number of standard deviations for example.

Another issue that arises is the length of time a process variable has exceeded a limit. Identifying the number of consecutive time slices or samples, or even the exact time that a variable has exceeded a limit is important. For example, if the time slices are one day averages, a count of "1" means the variable has exceeded the limit for one day; a "10" means it exceeded the limits for ten consecutive days.

In a method in which CUSUM inflection points are indexed and then stored in a table, identifying what variables caused a key performance indicator to change is made much easier. One need only look at the variables that set a CUSUM inflection point on that day. However, depending on the distribution and variation of the data, a variable may have changed but not set a new CUSUM inflection point. It might, however, exceed an alarm specified by calculating the number of standard deviations the variable lies outside the mean. By calculating the number of time slices (and thus the date) a variable first exceeded this calculated limit, one may identify its impact on a key performance indicator (KPI) (because we already calculated the data KPI either set a new CUSUM inflection point or itself deviated from the deviation specified limit).

We can also apply this method to statistics other than the average. For example, we can calculate the coefficient of variation of a variable (based on a set period of time) and then calculate statistical limits (2 or 3 sigma, for example) to identify when variation exceeds normal limits. Again, the data we are examining would be filtered to avoid examining bad quality data.

The method of alarming can take the form of either a real time alarm or a daily alarm or event summary. The alarm may be based on standard deviation feedback.

The method is not limited to data historians; it can also be applied to continuous control systems such as Programmable Logic Controllers (PLCs) or Distributed Control Systems (DCS).

Example 1

The following is one exemplary method for determining process data exceptions, where Sigma equals one (1) Standard Deviation.

Step 1—Identify production trigger; various constraints (e.g., Temp. >80 degrees, speed >100, etc.)
Step 2—Define time slice (e.g., 1 hr., 1 day, etc.)
Step 3—Identify time slices that meet criteria; "Bins"
Step 4—Calculate statistics for each "bin" (e.g. average-250 bins=250 average)
Step 5—Calculate overall average (e.g., 250 bins=1 average) and calculate standard deviation (e.g., 250 bins=1sigma (1 standard deviation))
Step 6—Identify sensitivity (e.g., 2sigma, 3sigma, etc.)
Step 7—Calculate average (e.g., +2sigma and average-2sigma)
Step 8—Identify variables that exceed 2sigma; count how many slices exceeded 2sigma to obtain the duration (length of time) a process variable has exceeded a limit.

Example 2

Turning to FIG. 14, a chart of exceptions is illustrated. The table lists the following:
Tag Name—exceptions;
High Limit—for example, mean plus two standard deviations;
Low Limit—for example, mean minus two standard deviations;
Last Value—Value of last (most recent) time slice;
Consecutive Slices—number of consecutive slices the tag has exceeded two sigma limits;
Percent deviation;
Most Recent Time Slice—Time stamp of most recent time slice (may differ if there is no data on December 20, for example); and
Date of Deviation—Time stamp of slice when the tag exceeded the limits.

FIG. 15 shows why time stamps and consecutive slices important. If it is known the process had an upset on November 27 for example, the exceptions can be filtered to identify the tags that exceeded two sigma exceptions.

It will be understood that implementations are not limited to the specific components disclosed herein, as virtually any components consistent with the intended operation of a method and/or system implementation for identifying process data exceptions may be utilized. Accordingly, for example, although particular computers, servers, routers, keyboards, mice, network interfaces, screens, bar plots, and network components may be disclosed, such components may comprise any shape, size, style, type, model, version, class, grade, measurement, concentration, material, weight, quantity, and/or the like consistent with the intended operation of a method and/or system implementation for a data analysis system may be used.

In places where the description above refers to particular implementations of a computerized method for identifying process data exceptions, it should be readily apparent that a number of modifications may be made without departing from the spirit thereof and that these implementations may be applied to other data analysis systems and other related methods.

The invention claimed is:

1. A method for identifying data exceptions in a process comprising:
receiving an array of data from a historical information database comprising filtered data from the process including one or more dependent variables and one or more independent variables;
defining, by a microprocessor, a plurality of time slices or bins within the array of filtered data with a predetermined time period;
identifying, by a microprocessor, all variables outside of statistical limits that are continuously updated, based only on data when the process is running;
identifying, by a microprocessor, a date of an exception; and
prioritizing the exception in a list of a plurality of identified exceptions, whereby a user determines a machine or portion of the process to modify based on the list of a plurality of identified exceptions.

2. The method of claim 1, wherein the step of identifying, by a microprocessor, all variables outside of statistical limits that are continuously updated, based only on data when the process is running comprises:

calculating, by a microprocessor, an average and a coefficient of variation for a specified time slice in the database based on specified filter criteria;

calculating, by a microprocessor, a high limit and a low limit for both the average data and the coefficient of variation of each time slice; and identifying, by a microprocessor, the variables whose current value falls outside either the high limit or the low limit.

3. The method of claim 2, further comprising one of:

identifying, by a microprocessor, the variables whose average value for a given slice of time falls outside either the high limit or the low limit for evaluated all time slices; and identifying, by a microprocessor, the tags or variables whose coefficient of variation for a given slice of time falls outside either the high limit or the low limit for evaluated all time slices.

4. The method of claim 2, further comprising counting, by a microprocessor, the number of consecutive time slices one of:

a variable's average has been exceeding statistical limits; and a variable's coefficient of variation has been exceeding statistical limits.

5. The method of claim 4, further comprising identifying, by a microprocessor, the degree to which a variable exceeds either one of:

the average coefficient of variation statistical limit by calculating the number of standard deviations above the mean;

the percent deviation above the high limit; and the percent deviation below the low limit.

6. The method of claim 2, wherein the high limit is a first number of standard deviations above a mean, the low limit is a second number of standard deviations below the mean, and the first number is different from the second number.

7. The method of claim 1, wherein the step of identifying, by a microprocessor, a date of an exception comprises identifying, by a microprocessor, the variables that exceed historical statistical limits one of:

at a current time;

at a specified time; and at an archived time.

8. The method of claim 1, further comprising identifying, by a microprocessor, possible variables that caused the process to deviate.

9. A method for identifying data exceptions in a process comprising:

receiving an array of data from a historical information database comprising filtered data from the process including one or more dependent variables and one or more independent variables;

defining, by a microprocessor, a plurality of time slices or bins within the array of filtered data with a predetermined time period;

identifying, by a microprocessor, all variables outside of statistical limits that are continuously updated, based only on data when the process is running, by:

calculating, by a microprocessor, an average and a coefficient of variation for a specified time slice in the database based on specified filter criteria;

calculating, by a microprocessor, a high limit and a low limit for both the average data and the coefficient of variation of each time slice; and identifying, by a microprocessor, the variables whose current value falls outside either the high limit or the low limit; and identifying, by a microprocessor, a date of an exception.

10. The method of claim 9, further comprising one of:

identifying, by a microprocessor, the variables whose average value for a given slice of time falls outside either the high limit or the low limit for evaluated all time slices; and identifying, by a microprocessor, the tags or variables whose coefficient of variation for a given slice of time falls outside either the high limit or the low limit for evaluated all time slices.

11. The method of claim 10, further comprising counting, by a microprocessor, the number of consecutive time slices one of:

a variable's average has been exceeding statistical limits; and a variable's coefficient of variation has been exceeding statistical limits.

12. The method of claim 11, further comprising identifying, by a microprocessor, the degree to which a variable exceeds either one of:

the average coefficient of variation statistical limit by calculating the number of standard deviations above the mean;

the percent deviation above the high limit; and the percent deviation below the low limit.

13. The method of claim 9, wherein the step of identifying, by a microprocessor, a date of an exception comprises identifying, by a microprocessor, the variables that exceed historical statistical limits one of:

at a current time;

at a specified time; and at an archived time.

14. The method of claim 9, further comprising identifying, by a microprocessor, possible variables that caused the process to deviate.

* * * * *